United States Patent
Warner et al.

(10) Patent No.: US 8,803,046 B2
(45) Date of Patent: Aug. 12, 2014

(54) INDUCTOR ASSEMBLY FOR TRANSVERSE FLUX ELECTRIC INDUCTION HEAT TREATMENT OF ELECTRICALLY CONDUCTIVE THIN STRIP MATERIAL WITH LOW ELECTRICAL RESISTIVITY

(75) Inventors: Gregg G. Warner, Menomonee Falls, WI (US); James D. Parker, Brookfield, WI (US); John Justin Mortimer, Genesee, WI (US)

(73) Assignee: Radyne Corporation, Milwaukee, WI (US)

( * ) Notice: Subject to any disclaimer, the term of this patent is extended or adjusted under 35 U.S.C. 154(b) by 254 days.

(21) Appl. No.: 12/852,666

(22) Filed: Aug. 9, 2010

(65) Prior Publication Data

US 2011/0036831 A1  Feb. 17, 2011

Related U.S. Application Data

(60) Provisional application No. 61/232,976, filed on Aug. 11, 2009.

(51) Int. Cl.
*H05B 6/14* (2006.01)
*H05B 6/60* (2006.01)

(52) U.S. Cl.
USPC ........... 219/645; 219/155; 219/602; 219/675; 219/632; 219/677; 219/653

(58) Field of Classification Search
CPC ........... H05B 6/105; H05B 6/362; H05B 6/36
USPC ......... 219/602, 615, 632, 645, 648, 653, 675, 219/677
See application file for complete search history.

(56) References Cited

U.S. PATENT DOCUMENTS

| | | | |
|---|---|---|---|
| 4,778,971 A * | 10/1988 | Sakimoto et al. | 219/645 |
| 5,495,094 A * | 2/1996 | Rowan et al. | 219/645 |
| 5,953,363 A * | 9/1999 | Cao | 373/161 |
| 6,677,561 B1 * | 1/2004 | Koppinen et al. | 219/645 |
| 6,963,056 B1 * | 11/2005 | Peysakhovich et al. | 219/645 |
| 2002/0121512 A1* | 9/2002 | Thorpe et al. | 219/645 |
| 2002/0148830 A1* | 10/2002 | Ross | 219/670 |
| 2003/0192878 A1* | 10/2003 | Anderhuber et al. | 219/600 |
| 2004/0016478 A1* | 1/2004 | Sharpe et al. | 148/567 |
| 2006/0196870 A1* | 9/2006 | Nikanorov et al. | 219/645 |
| 2010/0108665 A1* | 5/2010 | Hirota | 219/600 |

* cited by examiner

*Primary Examiner* — Fernando L Toledo
*Assistant Examiner* — Peter Bradford
(74) *Attorney, Agent, or Firm* — Philip O. Post

(57) ABSTRACT

Apparatus and method are provided for electric induction heat treatment of electrically conductive thin strip material. Multiple series-connected coil loops, each having a pole pair, are provided in each of a top and bottom induction coil, which are positioned mirror image to each other. The top and bottom induction coils form a transverse flux induction heat treatment apparatus. A separate flux concentrator is provided over and on the side of each pole. The thin strip material passes between the poles of the top and bottom induction coils and the flux concentrators associated with each of the poles.

16 Claims, 6 Drawing Sheets

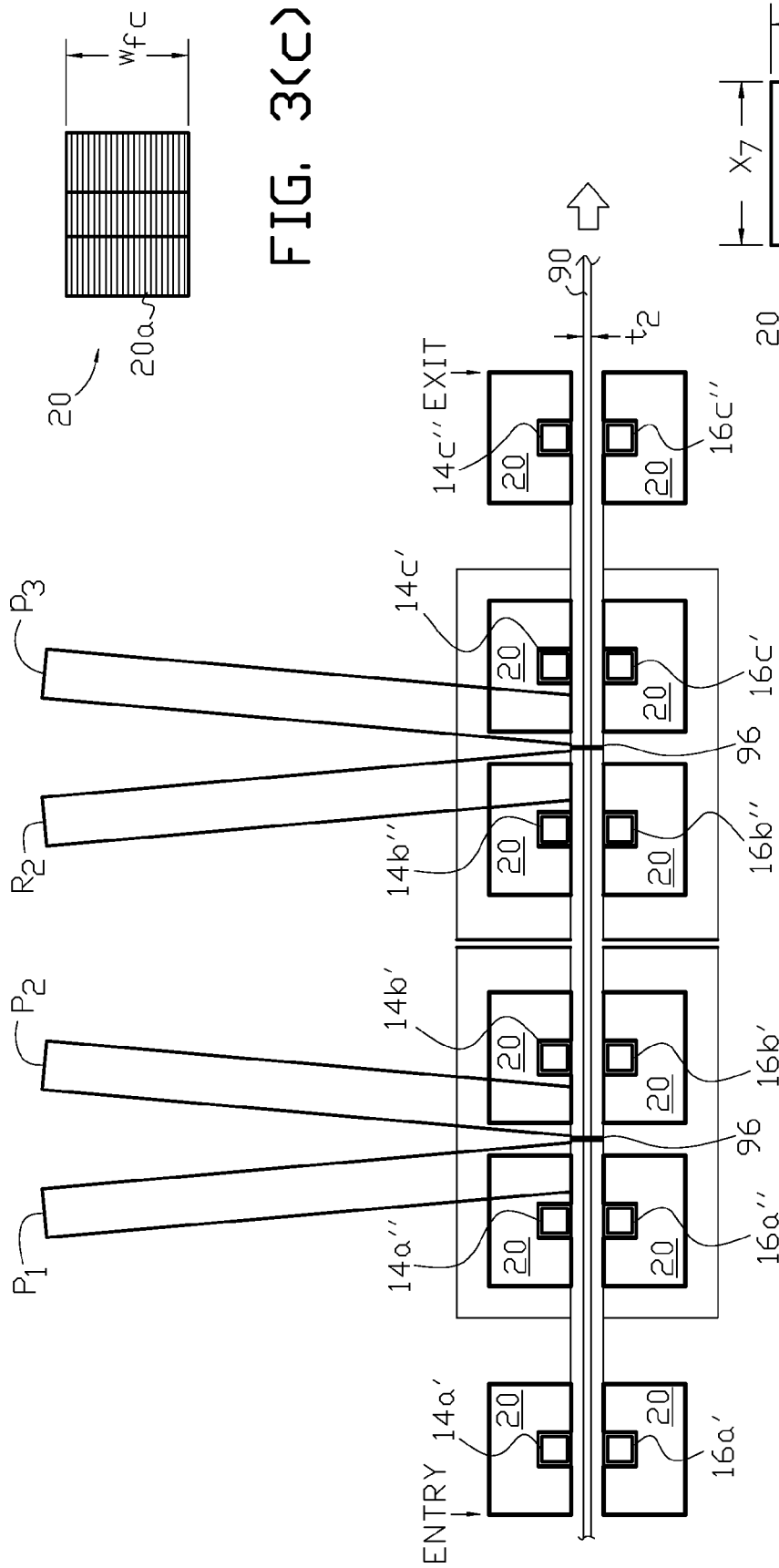
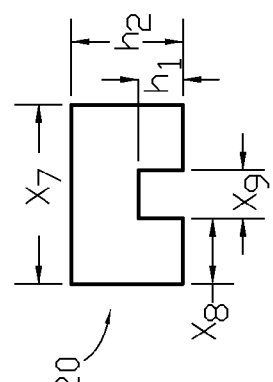

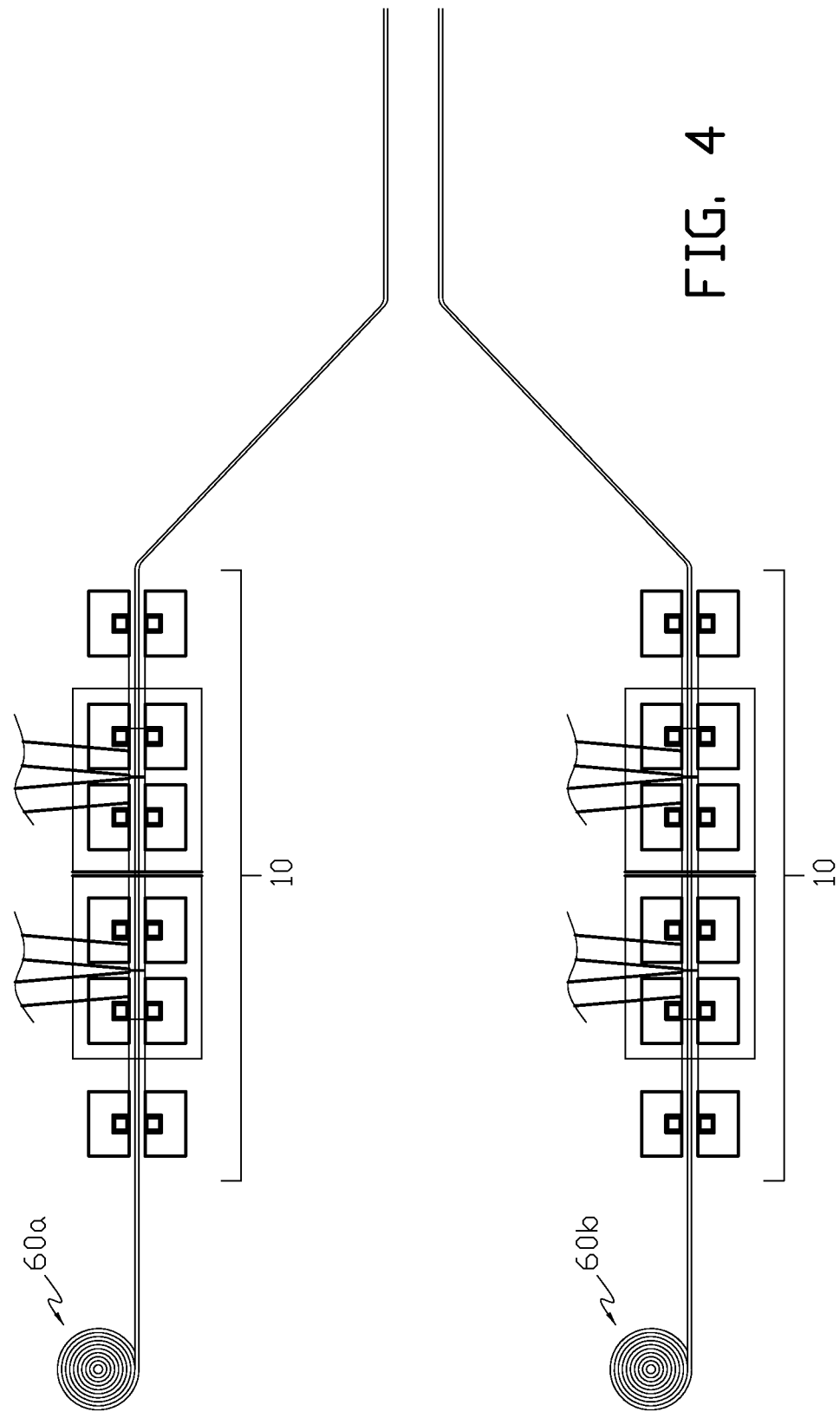

INDUCTOR ASSEMBLY FOR TRANSVERSE FLUX ELECTRIC INDUCTION HEAT TREATMENT OF ELECTRICALLY CONDUCTIVE THIN STRIP MATERIAL WITH LOW ELECTRICAL RESISTIVITY

CROSS-REFERENCE TO RELATED APPLICATIONS

This application claims the benefit of U.S. Provisional Application No. 61/232,976 filed Aug. 11, 2009, which is hereby incorporated by reference in its entirety.

FIELD OF THE INVENTION

The present invention relates to electric induction heat treatment of electrically conductive thin strip materials.

BACKGROUND OF THE INVENTION

A known apparatus for electric induction heat treatment of thin strip material is illustrated in FIG. 1(a) and FIG. 1(b). A pair of induction coils 112a and 112b form a transverse flux inductor. Each coil has two transverse poles; coil 112a has poles 112a' and 112a", and coil 112b has poles 112b' and 112b". Thin strip 90 is positioned between the pair of coils. The thin strip may have a width, $w_1$, for example, of $7/16^{th}$ of an inch and a thickness, $t_1$, of 0.01-inch. A single flux concentrator 114 is typically positioned over and around the two poles of each coil as shown in the figures. When a suitable alternating current (AC) is supplied to the pair of coils, a magnetic field is generated around the coil poles and the flux concentrators direct the magnetic flux towards the opposing surfaces of the thin strip so that it is inductively heated, for example, in an annealing or other metallurgical heat treatment process.

When the thin strip comprises a material with low resistivity (high conductivity) such as a copper strip, the arrangement shown in FIG. 1(a) and FIG. 1(b) is not very efficient.

It is one objective of the present invention to provide apparatus for, and method of, inductively heat treating a thin electrically conductive strip material, particularly when the strip material comprises a low resistivity composition such as copper.

SUMMARY OF THE INVENTION

Apparatus and method are provided for electric induction heat treatment of an electrically conductive thin strip material. Multiple series-connected coil loops, each having a pole pair, are provided in each of a top and bottom induction coil, which are positioned mirror image to each other. The top and bottom induction coils form a transverse flux induction heating apparatus. A separate flux concentrator is provided over and on the sides of each individual pole. The thin strip material passes between the poles of the top and bottom induction coils and the flux concentrators associated with each of the poles.

The above and other aspects of the invention are further set forth in this specification and the appended claims.

BRIEF DESCRIPTION OF THE DRAWINGS

For the purpose of illustrating the invention, there is shown in the drawings a form which is presently preferred. It being understood, however, that this invention is not limited to the precise arrangements and instrumentalities shown.

FIG. 3(a) and FIG. 3(b) are a top view and front elevation view, respectively, of the example of the arrangement of induction coils shown in FIG. 2(a) and FIG. 2(b) with the addition of individual pole flux concentrators and an example of cooling medium supplies and returns when the induction coils are cooled by flowing a cooling medium through interior passages in the induction coils.

FIG. 3(c) and FIG. 3(d) are top and side views, respectively of one example of a flux concentrator used in the present invention.

FIG. 4 illustrates one example of an application of a pair of the transverse flux induction heating apparatus shown in FIG. 2(a) through FIG. 3(b).

DETAILED DESCRIPTION OF THE INVENTION

While the present invention will be described in connection with a preferred embodiment, it will be understood that it is not intended to limit the invention to that embodiment. On the contrary, it is intended to cover all alternatives, modifications and equivalents as may be included within the scope of the invention.

Figure 1A:
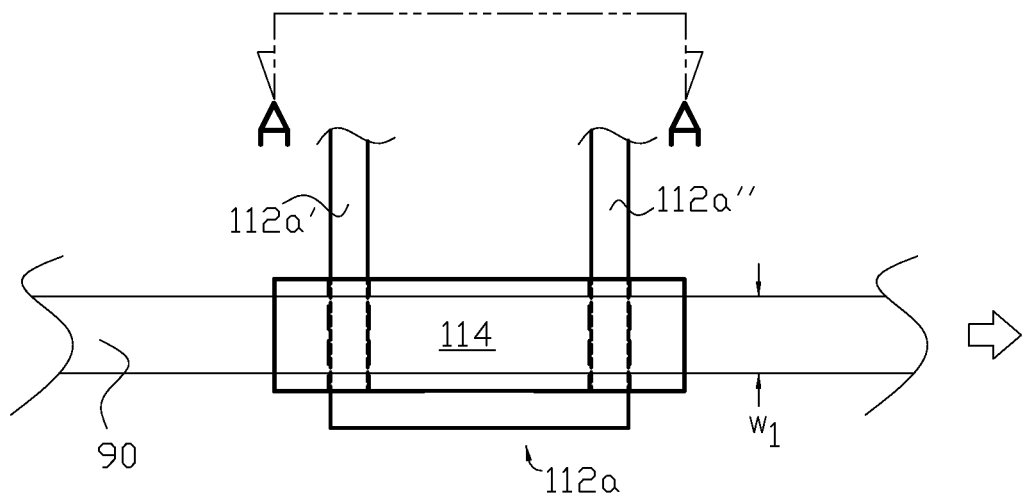
FIG. 1(a) and FIG. 1(b) illustrate in top plane view, and side elevational view through line A-A in FIG. 1(a), respectively, one known method of heat treating a thin electrically conductive strip by electric induction.
Figure 1B:
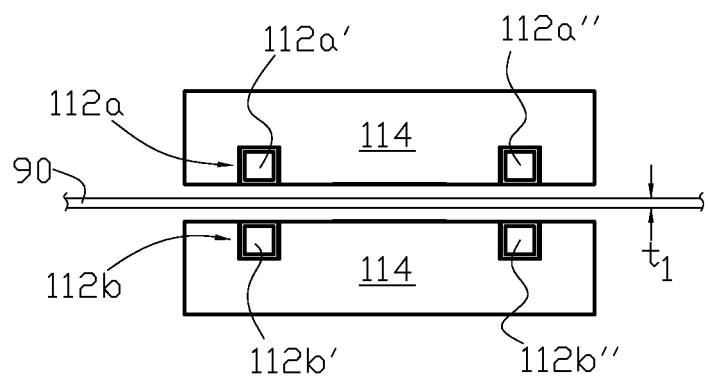
Figure 2A:
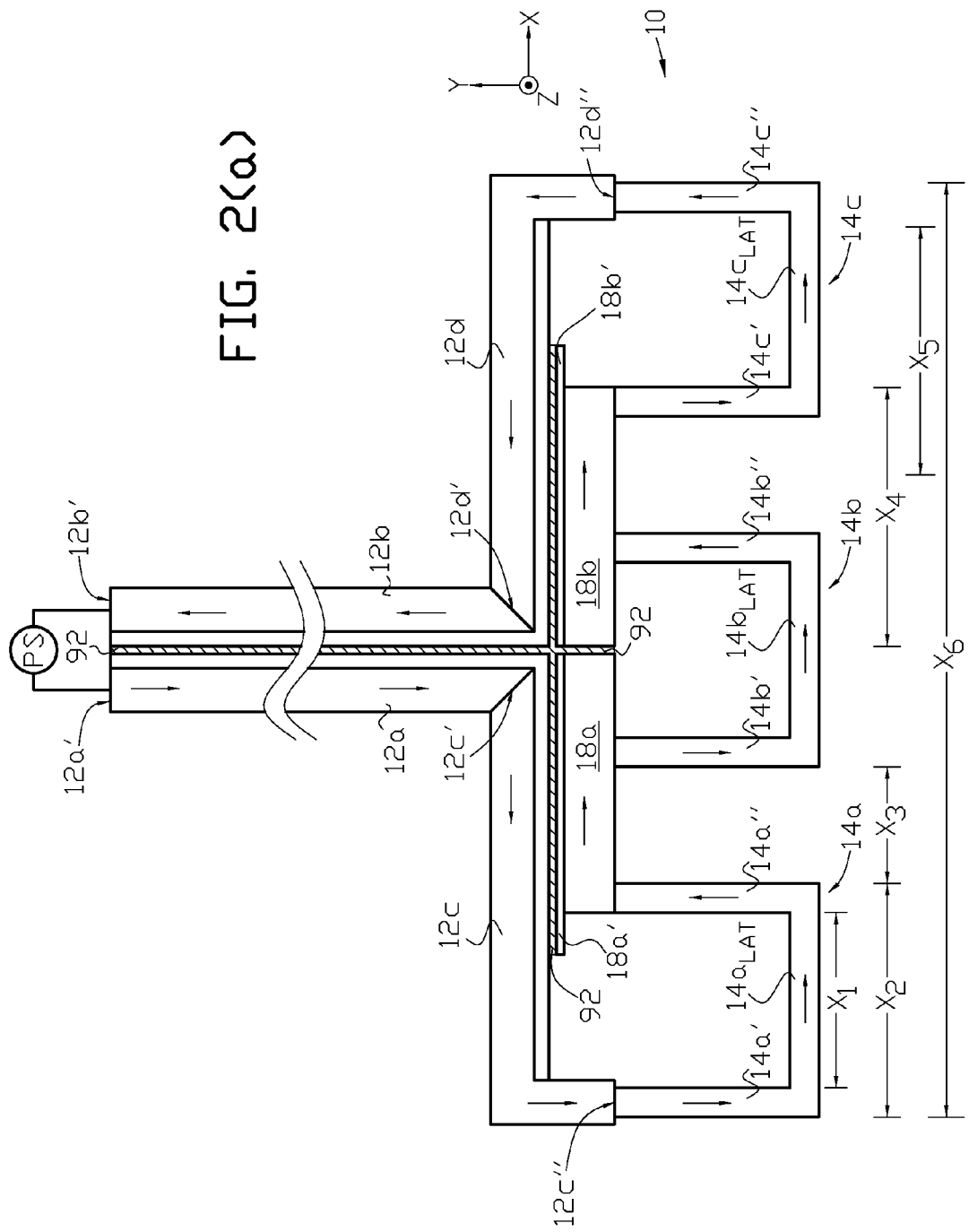
FIG. 2(a) and FIG. 2(b) are a top view and front elevational view, respectively, of one example of an arrangement of induction coils used in a transverse flux heating apparatus of the present invention.
Figure 2B:
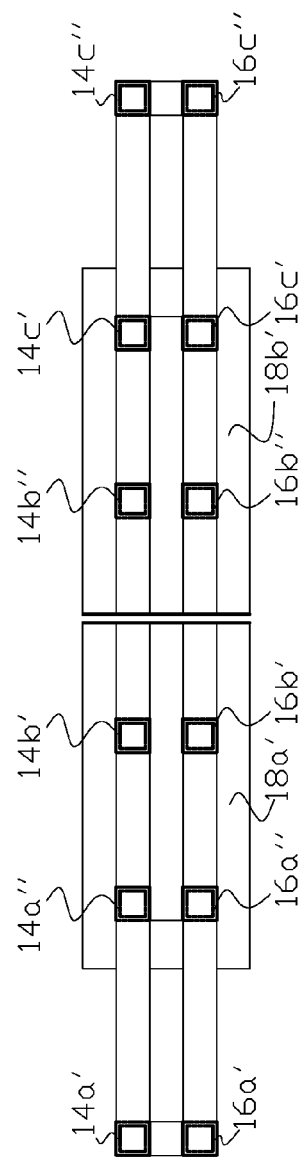

One example of the induction coils used in the transverse flux induction heating apparatus, or inductor assembly, of the present invention is illustrated in FIG. 2(a) and FIG. 2(b). Power supply (PS) feeder electrical conductors 12a and 12b (separated by dielectric 92 shown with crosshatching) are suitably connected either directly or indirectly to a single phase source of AC current at ends 12a' and 12b'. The power supply feeder conductors spread apart in the indicated X-direction via branch electrical conductors 12c and 12d, which in this example of the invention are substantially perpendicular to the feeder electrical conductors, and have facing adjacent ends (12c', 12d') connected to the power supply (12a) and return (12b) feeder conductors located approximately at the mid-length of the inductor assembly where the length of the inductor assembly is generally defined by the distance $x_6$ shown in FIG. 2(a). In this example of the invention, feeder conductor 12a and branch conductor 12c are referred to as the supply feeder and supply branch conductors, respectively, and feeder conductor 12b and branch conductor 12d are referred to as the return feeder and return branch conductors, respectively. Three induction coil loops 14a, 14b and 14c are connected in series between ends 12c" and 12d" of the branch conductors for top induction coil 14, which is made up of the three coil loops connected together in series, and, and three induction coil loops 16a, 16b and 16c are connected in series between ends 12c" and 12d" of the branch conductors to form bottom induction coil 16. While three top and bottom coil loops are shown in this example, any number of top and bottom coil loops may be used in other examples of the inductor assembly of the present invention. Opposing top and bottom coil pairs: 14a and 16a; 14b and 16b; or 14c and 16c may be referred to as a top and bottom coil pair. One advantage of using multiple series-connected coil loops instead of a single coil loop in the inductor assembly of the present invention is that an increased throughput rate of thin strip material for a given electrical current magnitude is achievable while maintaining lower, and more manageable, power densities on each of the flux concentrators 20, which are described below. Bottom induction coil 16 is a mirror image of top induction coil 14 though an X-Y plane, which also generally defines the plane of a strip material passing between the top and bottom induction coils. The pole pair, or coil pole segments (a first and a second coil loop pole segment), for each coil loop comprises, for example, coil pole segments 14a' and 14a" (first coil loop pole segment and second coil loop pole segment) for induction coil loop 14a, with pole pitch $x_1$, which is established by the length of the lateral coil segment joining together the coil pole segments (at first ends of the first and second coil loop pole segments) on one side of the strip channel through which the strip material passes between the top and bottom induction coils. For example the lateral coil segment for induction coil loop 14a is lateral coil segment $14a_{LAT}$. The pole pitch may be different for each of the pole pairs in coils 14 and 16 while maintaining the mirror image arrangement.

In this example of the invention, as shown in FIG. 2(a) and FIG. 2(b), coil pole segments 14a" and 16a" of coil loops 14a and 16a are electrically connected together (at their second ends) to coil pole segments 14b' and 16b' (at their second ends) of adjacent coil loops 14b and 16b by common inter-coil pole segment 18a, which in this example of the invention is in the shape of a conductor block. Coil pole segments 14c' and 16c' of coil loops 14c and 16c are electrically connected together at their second ends) to coil pole segments 14b" and 16b" of coil loops 14b and 16b at their second ends) via common inter-coil pole segment 18b, which in this example of the invention is in the shape of a conductor block. Induction coil loops 14b and 16b are electrically connected between common inter-coil pole segments 18a and 18b via coil pole segments 14b' and 16b' being connected to common inter-coil pole segment 18a, and coil pole segments 14b" and 16b" being connected to common inter-coil pole segment 18b. Instantaneous direction of AC current flow path through transverse flux heating apparatus 10 is illustrated by the arrows in FIG. 2(a) for top induction coil 14, with instantaneous direction of AC current flow in bottom induction coil 16 being the same as that in the top induction coil.

Figure 2C:
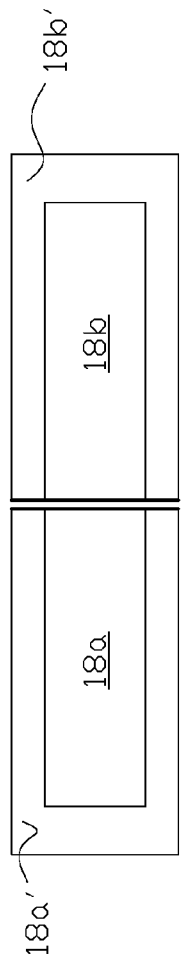
FIG. 2(c) is an elevational view of one example of two conductor blocks used to interconnect coil loops in the apparatus shown in FIG. 2(a) and FIG. 2(b).

In this example of the invention, referring to FIG. 2(c), common inter-coil pole (conductor block) segment 18a is electrically connected to common conductor plate 18a', and common inter-coil pole (conductor block) segment 18b is electrically connected to common conductor plate 18b'. As shown in FIG. 2(a), the combination of conductor block 18a and plate (or sheet) 18a' conductor is electrically isolated from the combination of conductor block 18b and plate 18b' conductor by dielectric 92. Similarly both combination block and plate conductors are separated from the branch electrical conductors by dielectric 92. In this example of the invention, the conductor blocks and plates provide a convenient means of electrically interconnecting the multiple coil loops. Other examples of the invention may utilize other satisfactory electrical interconnecting elements between the coil loops.

Figure 2E:
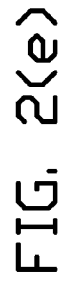
FIG. 2(e) is a front elevational view of the arrangement shown in FIG. 2(d) through line B-B.
Figure 2D:
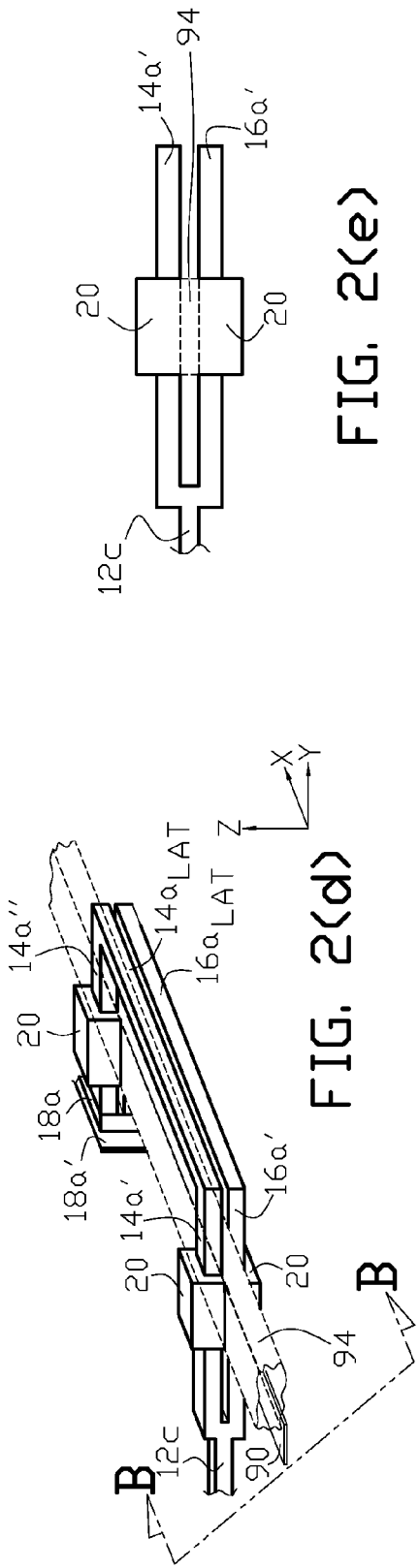
FIG. 2(d) is a partial isometric view of a thin strip tunnel, or channel, relative to the top and bottom coil loops and individual flux concentrators used with each coil pole in one example of the present invention.

Referring to FIG. 2(d) and FIG. 2(e) in one example of the inductor assembly of the present invention, top coil loop 14a and bottom coil loop 16a are shown relative to the spatial boundary of strip channel 94 (shown in dashed lines) through which strip material 90 moves, with lateral coil segments $14a_{LAT}$ and $16a_{LAT}$ located on one side of the strip channel and common inter-coil pole segments 18a and 18b (with associated conductor plates 18a' and 18b' in this example) located on an opposing side of the strip channel.

Figure 3A:
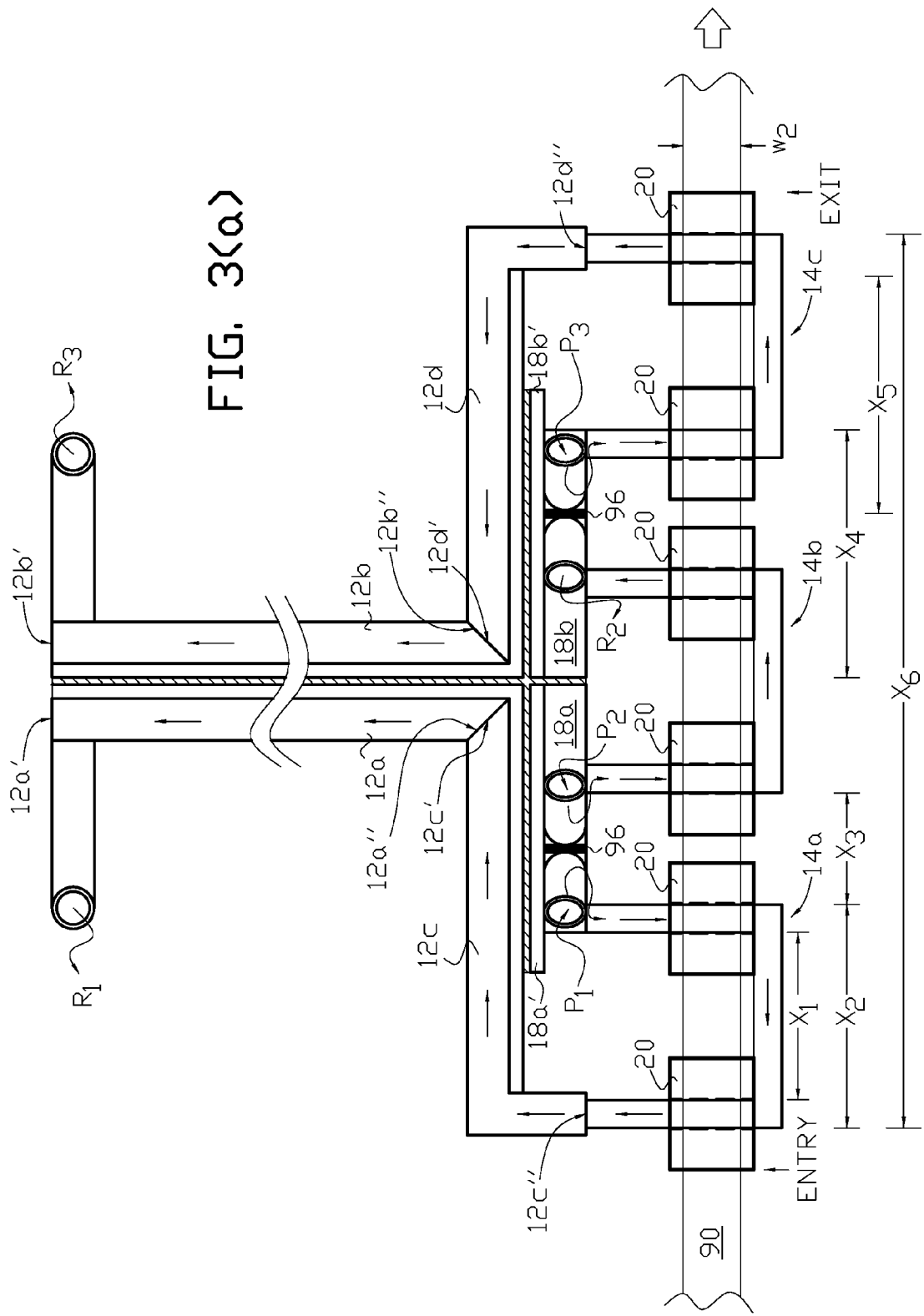

FIG. 3(a) and FIG. 3(b) illustrate the addition of a separate flux concentrator 20 for each coil pole. FIG. 3(c) and FIG. 3(d) illustrate one example of the configuration of a flux concentrator used in the present invention where a flux concentrator 20 is positioned above ($x_7$) and around the opposing sides ($h_2$) of each individual coil loop pole segment. The flux concentrators may be formed from any high permeability, low loss materials, such as silicon steel laminations 20a as illustrated in FIG. 3(c), pure ferrites, or iron-ferrite based compositions.

When the thin strip material has a low electrical resistivity (high electrical conductivity) such as a copper strip with a nominal electrical resistivity of approximately 16.78 nΩ·m at 20° C., utilization of separate flux concentrators for each pole of the induction coils can increase throughput of a heat treated strip material in the range of 50 percent for the same supply current and power magnitudes. Higher frequencies in the range of 30 kHz have also shown a similar throughput increase.

Thin strip 90 is passed between the top and bottom flux concentrators individually attached to each coil pole as shown, for example, in FIG. 3(a) and FIG. 3(b). The width, $w_2$, of thin strip 90 is less than or equal to the width, $w_{fc}$, of the flux concentrators.

If the induction coils are cooled by a cooling medium, such as water flowing through interior passages in the induction coils, the cooling medium distribution system shown in FIG. 3(a) and FIG. 3(b) may be utilized. In this arrangement, cooling distribution is segregated into three sections. Opposing end coolant distribution sections comprise coolant supplies at inlets $P_1$ and $P_3$ and coolant returns at outlets $R_1$ and $R_3$, respectively, with the arrows indicating coolant flow direction within the hollow coil sections. The central cooling distribution section comprises inlets $P_2$ and outlet $R_2$, with the arrows indicating preferred coolant flow direction within the hollow coil sections. Coolant barriers 96 are formed in the interior passages of conductor blocks 18a and 18b to establish the isolated central distribution section. That is, coolant barrier 96 establishes two isolated (or segregated) internal cooling flow passages in each conductor block 18a and 18b. In further detail of one example of a cooling system utilized in the present invention, the first (first end section) segregated, or isolated, cooling system comprises a first cooling medium supply connected to inlet $P_1$ at the first end of the first cooling medium through passage in the rectangular conductor (block 18a) of the first common inter-coil pole segment. The second end of the first cooling medium through passage in the rectangular conductor of the first common inter-coil pole segment is connected to the first end of the internal through passages in the first top and bottom coil loops 14a and 16a, and the second end of the internal through passages in the first top and bottom coil loops 14a and 16a are connected to the first end 12c" of the internal through passage in the power supply branch conductor 12c. The second end 12c' of the internal through passage in the power supply branch conductor is connected to the first end 12a" of the internal through passage in the power supply feeder conductor 12a, and the second end 12a' of the internal through passage in the power supply feeder conductor 12a is connected to a first cooling medium supply return connection at outlet $R_1$ as shown in FIG. 3(a) and FIG. 3(b). The second (central section) segregated, or isolated, cooling system comprises a second cooling medium supply connected to inlet $P_2$ at the first end of the second cooling medium through passage in the rectangular conductor (block 18a) of the first common inter-coil pole segment, and the second end of the second cooling medium through passage in the rectangular conductor of the first common inter-coil pole segment is connected to the first end of the internal through passages in the second top and bottom coil loops 14b and 16b. The second end of the internal through passages in the second top and bottom coil loops 14b and 16b are connected to the first end of the first isolated cooling medium through passage in the rectangular conductor (block 18b) of the second common inter-coil pole segment, and the second end of the first cooling medium through passage in the rectangular conductor of the second common inter-coil pole segment is connected to a second cooling medium supply return connection at outlet $R_2$ as shown in FIG. 3(a) and FIG. 3(b). The third (second end section) segregated, or isolated, cooling system comprises a third cooling medium supply connected to inlet $P_3$ at the first end of the second cooling medium through passage in the rectangular conductor (block 18a) of the second common inter-coil pole segment, and the second end of the second cooling medium through passage in the rectangular conductor of the second common inter-pole segment is connected to the first end of the internal through passages in the third top and bottom coil loops 14c and 16c. The second end of the internal through passages in the third top and bottom coil loops 14c and 16c are connected to the first end 12d'' of the internal through passage in the power return branch conductor 12d, and the second end 12d' of the internal through passage in the power return branch conductor is connected to the first end 12b'' of the internal through passage in the power return feeder conductor 12. The second end 12b' of the internal through passage in the power return feeder conductor 12b is connected to a third cooling medium supply return connection at outlet $R_3$ as shown in FIG. 3(a) and FIG. 3(b). In a particular application, the first, second and third cooling medium supplies and returns may be three separate supply and return connections to a single cooling apparatus.

In one example of the invention, an apparatus of the present invention as shown in FIG. 3(a) and FIG. 3(b) was arranged as follows: $x_1$ approximately equal to 1.5 inches; $x_2$ approximately equal to 2.0 inches; $x_3$ approximately equal to 1.0 inch; $x_4$ approximately equal to 2.219 inches; $x_5$ approximately equal to 2.125 inches; and $x_6$ (the overall induction coil length) approximately equal to 8.0 inches. Utilized flux concentrators 20 as shown in FIG. 3(c) and FIG. 3(d) were as follows: transverse width, $w_{fc}$, approximately equal to 0.75-inch; $x_7$ approximately equal to 1.0 inch; $x_8$ approximately equal to 0.37-inch; $x_9$ approximately equal to 0.27-inch; $h_1$ approximately equal to 0.25-inch; and $h_2$ approximately equal to 0.63-inch. With this example apparatus, satisfactory induction heat treatment annealing of strips with widths, $w_2$, in the range from at least 0.38-inch to 0.53-inch, and thicknesses, $t_2$, in the range from at least 0.009-inch (228.6 microns) to 0.025-inch (635 microns) was achievable. In the present invention low power source output frequency, $f_{low}$, is established for the narrowest strip. With the narrowest strip being 0.38 inches wide and 0.025 inches thick, $f_{narrow}$ may be selected as approximately 8.4 kHz with a corresponding power level, $P_{narrow}$, approximately equal to 27 kW, and a corresponding coil current, $I_{narrow}$, approximately equal to 3,840 amperes resulting in an exit temperature of 1,200° F. for the strip at a rate of 130 feet/minute. Correspondingly with the widest strip being 0.53 inches wide and 0.016 inches thick, $f_{wide}$, may be selected as approximately 9.4 kHz with a power level, $P_{wide}$, approximately equal to 16.5 kW, and a corresponding coil current, $I_{wide}$, approximately equal to 2,880 amperes resulting in an exit temperature of 1,200° F. for the strip at a rate of 110 feet/minute. For a strip 0.50-inch wide and 0.010-inch thick, frequency may be selected as approximately 9.0 kHz with a corresponding power level approximately equal to 13.5 kW, and a corresponding coil current approximately equal to 2,400 amperes resulting in an exit temperature of 1,200° F. for the strip at a rate of 130 feet/minute. Given the above parameters for this example of the invention, coil efficiency is on the order of approximately 40 percent for a strip thickness of 0.016-inch; approximately 35 percent for a strip thickness of 0.010-inch; and approximately 30 percent for the thickest strip of 0.025-inch. Coil efficiency therefore may be increased by reducing coil overhang. Entry temperatures for the above examples are 70° F. nominal. For a given strip size and exit temperature, throughput rate increases or decreases linearly as a function of the coil current squared. In addition, for a given strip size and throughput rate, exit temperature increases or decreases linearly with respect to the coil current squared. By way of example and not limitation, the apparatus and process of the present invention can be utilized to heat treat strip material with a nominal electrical resistivity of less than approximately 70.0 nano-ohm meters, and thicknesses at least within the approximate range of 228 to 635 microns with applied induction frequencies at least within the range of 8 to 30 kiloHertz.

In some examples of the invention, the top and bottom induction coils may be encased in a suitable refractory material, or other enclosing structure, having an open through tunnel, or strip channel, in the refractory between the top and bottom induction coils for passage of the thin strip material. In some examples of the invention, at least the strip channel may be enclosed as a substantially sealed, or gas-tight tunnel, for example, to contain process gasses or operate at a pressure other than atmospheric, when, for example, the metallurgical induction heat treatment is thermal bonding of a coating material to the strip where the heat bonding process releases solvent vapors.

The thin strip material may either be thin strips of discrete length consecutively fed between the induction coils in the strip channel, or a continuous roll of thin strip material continuously fed between the induction coils in the strip channel.

FIG. 4 illustrates one application of the transverse flux induction heating apparatus 10 of the present invention. In this application, two apparatus 10, as shown in FIG. 3(b) are utilized. Each apparatus 10 continuously anneals a thin metal strip feed from supply rolls 60a and 60b. Subsequent to annealing, the thin strips may be used in a further industrial process or collected on a roll for future use. Further industrial processing may include bonding of the two strips together or wrapping the strips around a tube or pipe to form a cladded end product.

The arrangement of the feeder and branch electrical conductors are one example of supply AC current from a source to the top and bottom induction coils. Other examples of the invention may utilize different arrangement of electrical conductors from the power source to the induction coils. While one power source is utilized in the above examples, more than one power source may be utilized, for example, a separate power source may be provided for each of the top and bottom induction coils.

Specific terms of orientation, such as top, bottom and side, and orthogonal directions, are provided for convenience, and do not limit the scope of the invention.

The present invention has been described in terms of preferred examples and embodiments. Equivalents, alternatives and modifications, aside from those expressly stated, are possible and within the scope of the invention.

The invention claimed is:

1. An inductor assembly for a transverse flux induction heat treatment of a strip material having a nominal electrical resistivity of less than approximately 70.0 nano-ohm meters, the inductor assembly comprising:

a first top coil loop, a second top coil loop and a third top coil loop, each of the first, the second and the third top coil loops comprising:

a pair of top coil loop pole segments comprising a first top coil loop pole segment and a second top coil loop pole segment, the first top coil loop pole segment and the second top coil loop pole segment each having a first top coil pole segment end and a second top coil pole segment end, the pair of top coil loop pole segments longitudinally disposed substantially perpendicular to a direction in which the strip material travels, the pair of top coil loop pole segments separated by a pole pitch;

a lateral top coil segment disposed at a first strip channel side, the lateral top coil segment connected between the first top coil pole segment ends of the first top coil loop pole segment and the second top coil loop pole segment comprising the pair of top coil loop pole segments;

a first bottom coil loop, a second bottom coil loop and a third bottom coil loop, each of the first, the second and the third bottom coil loops comprising:

a pair of bottom coil loop pole segments comprising a first bottom coil loop pole segment and a second bottom coil loop pole segment, the first bottom coil loop pole segment and the second bottom coil loop pole segment each having a first bottom coil pole segment end and a second bottom coil pole segment end; the pair of bottom coil loop pole segments longitudinally disposed substantially perpendicular to the direction in which the strip material travels, the pair of bottom coil loop pole segments separated by the pole pitch;

a lateral bottom coil segment disposed at the first strip channel side, the lateral bottom coil segment connected between the first bottom coil pole segment ends of the first bottom coil loop pole segment and the second bottom coil loop pole segment comprising the pair of bottom coil loop pole segments; (1) the first, the second and the third top coil loops, and (2) the first, the second and the third bottom coil loops respectively located at the opposing top and bottom of the strip channel through which the strip material travels, the first, the second and the third bottom coil loops respectively arranged mirror image to the first, the second and the third top coil loops;

a first common inter-pole segment located on a second side of the strip channel, the second side of the strip channel opposite the first side of the strip channel: (1) the second top coil pole segment end of the second top coil loop pole segment of the first top coil loop; (2) the second top coil pole segment end of the first top coil loop pole segment of the second top coil loop; (3) the second bottom coil pole segment end of the second bottom coil loop pole segment of the first bottom coil loop; and (4) the second bottom coil pole segment end of the first bottom coil loop pole segment of the second bottom coil loop electrically connected together by the first common inter-pole segment; and a second common inter-pole segment located on the second side of the strip channel: (1) the second top coil pole segment end of the second top coil loop pole segment of the second top coil loop; (2) the second top coil pole segment end of the first top coil loop pole segment of the third top coil loop (3) the second bottom coil pole segment end of the second bottom coil loop pole segment of the second bottom coil loop; and (4) the second bottom coil pole segment end of the first bottom coil loop pole segment of the third bottom coil loop electrically connected together by the second common inter-pole segment;

a discrete flux concentrator disposed above and around a first side and a second side of each of the first and second top coil loop pole segments comprising the pair of top coil loop pole segments of the first, the second and the third top coil loops, and each of the first and second bottom coil loop pole segments comprising the pair of bottom coil loop pole segments of the first, the second and the third bottom coil loops; and a single phase alternating current source having a first source output and a second source output, the first source output connected to the second top coil pole segment end of the first top coil loop pole segment of the first top coil loop and the second bottom coil pole segment end of the first bottom coil loop pole segment of the first bottom coil loop, and the second source output connected to the second top coil pole segment end of the second top coil loop pole segment of the third top coil loop and the second bottom coil pole segment end of the second bottom coil loop pole segment of the third bottom coil loop.

2. The inductor assembly of claim 1 wherein the first source output and the second source output comprise:

a power supply branch conductor and a power return branch conductor each respectively arranged substantially parallel to the first common inter-pole coil segment and the second common inter-pole coil, the power supply branch conductor disposed adjacent to the first common inter-coil pole segment and separated from the first common inter-coil pole segment by a dielectric, the power return branch conductor disposed adjacent to the second common inter-coil pole segment and separated from the second common inter-coil pole segment by the dielectric, the power supply branch conductor having a facing supply branch conductor end and an opposing supply branch conductor end at the opposite end of the facing supply branch conductor end, the power return branch conductor having a facing return branch conductor end and an opposing return branch conductor end at the opposite end of the facing return branch conductor end, the power supply branch conductor and the power return branch conductor linearly aligned with each other and having the facing supply branch conductor end and the facing return branch conductor end adjacent to each other approximately at a mid-length of the inductor assembly between the first and second common inter-coil pole segments, the facing supply branch conductor end and the facing return branch conductor end separated by the dielectric, the opposing supply branch conductor end of the power supply branch conductor connected to the second top coil pole segment end of the first top coil loop pole segment of the first top coil loop and the second bottom coil pole segment end of the first bottom coil loop pole segment of the first bottom coil loop, and the opposing return branch conductor end of the power return branch conductor connected to the second top coil pole segment end of the second top coil loop pole segment of the third top coil loop and the second bottom coil pole segment end of the second bottom coil loop pole segment of the third bottom coil loop; and a power supply feeder conductor and a power return feeder conductor, the power supply feeder conductor having a first supply feeder conductor end and a second supply feeder conductor end, and the power return feeder conductor having a first return feeder conductor end and a second return feeder conductor end, the facing supply branch conductor end connected to the first supply feeder conductor end of the power supply feeder conductor and the facing return branch conductor end connected to the first return feeder conductor end of the power return feeder conductor, the power supply feeder conductor and the power return feeder conductor disposed substantially perpendicular to the power supply branch conductor and the power return branch conductor, the power supply feeder conductor and the power return feeder conductor separated from each other by the dielectric, the second supply feeder conductor end of the power supply feeder conductor and the second return feeder conductor end of the power return feeder conductor connected respectively to the first source output and the second source output of the single phase alternating current source.

3. The inductor assembly of claim 1 wherein the first common inter-pole segment and the second common inter-coil pole segment each comprise a rectangular conductor electrically connected to a plate conductor.

4. The inductor assembly of claim 1 wherein the width of the discrete flux concentrator is at least as wide as the strip material traveling in the strip channel.

5. The inductor assembly of claim 1 further comprising the first top coil loop having a first top coil loop internal through passage, the first bottom coil loop having a first bottom coil loop internal through passage, the second top coil loop having a second top coil loop internal through passage, the second bottom coil loop having a second bottom coil loop internal through passage, the third top coil loop having a third top coil loop internal through passage, and the third bottom coil loop having a third bottom coil loop internal through passage, the inductor assembly further comprising an inductor assembly cooling system, the inductor assembly cooling system comprising:

a first isolated cooling system for a first cooling loop comprising the first top coil loop internal through passage and the first bottom coil loop internal through passage;

a second isolated cooling system for a second cooling loop comprising the second top coil loop internal through passage and the second bottom coil loop internal through passage; and a third isolated cooling system for a third cooling loop comprising the third top coil loop internal through passage and the third bottom coil loop internal through passage.

6. The inductor assembly of claim 5 wherein the first common inter-coil pole segment comprises a first rectangular conductor electrically connected to a first plate conductor and the second common inter-coil pole segment comprises a second rectangular conductor electrically connected to a second plate conductor and the first source output and the second source output comprise:

a power supply branch conductor and a power return branch conductor each respectively arranged substantially parallel to the first common inter-pole coil segment and the second common inter-coil pole segment, the power supply branch conductor disposed adjacent to the first common inter-coil pole segment and separated from the first common inter-pole segment by a dielectric, the power return branch conductor disposed adjacent to the second common inter-coil pole segment and separated from the second common inter-pole segment by the dielectric, the power supply branch conductor having a supply branch internal through passage and the power return branch conductor having a return branch internal through passage, the power supply branch conductor having a facing supply branch conductor end and an opposing supply branch conductor end at the opposite end of the facing supply branch conductor end, the power return branch conductor having a facing return branch conductor end and an opposing return branch conductor end at the opposite end of the facing return branch conductor end, the power supply branch conductor and the power return branch conductor linearly aligned with each other and having the facing supply branch conductor end and the facing return branch conductor end adjacent to each other approximately at a mid-length of the inductor assembly between the first and second common inter-coil pole segments, the facing supply branch conductor end and the facing return branch conductor end separated by the dielectric, the opposing supply branch conductor end of the power supply branch conductor connected to the second top coil pole segment end of the first top coil loop pole segment of the first top coil loop and the second bottom coil pole segment end of the first bottom coil loop pole segment of the first bottom coil loop, and the opposing return branch conductor end of the power return branch conductor connected to the second top coil pole segment end of the second top coil loop pole segment of the third top coil loop and the second bottom coil pole segment end of the second bottom coil loop pole segment of the third bottom coil loop; and a power supply feeder conductor and a power return feeder conductor, the power supply feeder conductor having a first supply feeder conductor end and a second supply feeder conductor end, and the power return feeder conductor having a first return feeder conductor end and a second return feeder conductor end, the power supply feeder conductor having a supply feeder internal through passage and the power return feeder conductor having a return feeder internal through passage, the facing supply branch conductor end connected to the first supply feeder conductor end of the power supply feeder conductor and the facing return branch conductor end connected to the first return feeder conductor end of the power return feeder conductor, the power supply feeder conductor and the power return feeder conductor disposed substantially perpendicular to the power supply branch conductor and the power supply return branch conductor, the power supply feeder conductor and the power return feeder conductor separated from each other by the dielectric, the second supply feeder conductor end of the power supply feeder conductor and the second return feeder conductor end of the power return feeder conductor connected respectively to the first source output and the second source output of the single phase alternating current source;

the inductor assembly further comprising a first cooling medium through passage and a second cooling medium through passage in the first rectangular conductor, a third cooling medium through passage and a fourth cooling medium through passage in the second rectangular conductor, the first and second cooling medium through passages isolated from each other in the first rectangular conductor to form a first isolated cooling medium through passage and a second isolated cooling medium through passage in the first rectangular conductor, and the third and fourth cooling medium through passages isolated from each other in the second rectangular conductor to form a third isolated cooling medium through passage and a fourth isolated cooling medium through passage in the second rectangular conductor;

the first isolated cooling system further comprising:

a first cooling medium supply connected to a first end of the first isolated cooling medium through passage in the first rectangular conductor, a second end of the first isolated cooling medium through passage in the first rectangular conductor connected to a first end of the first cooling loop comprising the first top coil loop internal through passage and the first bottom coil loop internal through passage, a second end of the first cooling loop connected to a first end of the supply branch internal through passage in the power supply branch conductor, a second end of the supply branch internal through passage in the power supply branch conductor connected to a first end of the supply feeder internal through passage in the power supply feeder conductor, and a second end of the supply feeder internal through passage in the power supply feeder conductor connected to a first cooling medium return connection;

the second isolated cooling system further comprising:

a second cooling medium supply connected to a first end of the second isolated cooling medium through passage in the first rectangular conductor, a second end of the second isolated cooling medium through passage in the first rectangular conductor connected to a first end of the second cooling loop comprising the second top coil loop internal through passage and the second bottom coil loop internal through passage, a second end of the second cooling loop connected to a first end of the third isolated cooling medium through passage in the second rectangular conductor, a second end of the third isolated cooling medium through passage in the second rectangular conductor connected to a second cooling medium return connection; and the third isolated cooling system further comprising:

a third cooling medium supply connected to a first end of the fourth isolated cooling medium through passage in the second rectangular conductor, a second end of the fourth isolated cooling medium through passage in the second rectangular conductor connected to a first end of the third cooling loop comprising the third top coil loop internal through passage and the third bottom coil loop internal through passage, a second end of the third cooling loop connected to a first end of the return branch internal through passage in the power return branch conductor, a second end of the return branch internal through passage in the power return branch conductor connected to a first end of the return feeder internal through passage in the power return feeder conductor and a second end of the return feeder internal through passage in the power return feeder conductor connected to a third cooling medium return connection.

7. The inductor assembly of claim 1 further comprising a refractory encasing the first, the second and the third top coil loops and the first, the second and the third bottom coil loops to form a refractory-encased top and bottom coil loops, the strip channel formed from a tunnel within the refractory-encased top and bottom coil loops.

8. The inductor assembly of claim 7 wherein the strip channel is a substantially gas-tight enclosure.

9. The inductor assembly of claim 1 wherein the strip material has a thickness approximately within the range of 228 microns to 635 microns.

10. An inductor assembly for a transverse flux induction heat treatment of a strip material having a nominal electrical resistivity of less than approximately 70.0 nano-ohm a first top coil loop, a second top coil loop and a third top coil loop, each of the first, the second and the third top coil loops comprising:

a pair of top coil loop pole segments comprising a first top coil loop pole segment and a second top coil loop pole segment, the first top coil loop pole segment and the second top coil loop pole segment each having a first top coil pole segment end and a second top coil pole segment end, the pair of top coil loop pole segments longitudinally disposed substantially perpendicular to a direction in which the strip material travels, the pair of top coil loop pole segments separated by a pole pitch;

a lateral top coil segment disposed at a first strip channel side, the lateral top coil segment connected between the first top coil pole segment ends of the first top coil loop pole segment and the second top coil loop pole segment comprising the pair of top coil loop pole segments;

a first bottom coil loop, a second bottom coil loop and a third bottom coil loop, each of the first, the second and the third bottom coil loops comprising:

a pair of bottom coil loop pole segments comprising a first bottom coil loop pole segment and a second bottom coil loop pole segment, the first bottom coil loop pole segment and the second bottom coil loop pole segment each having a first bottom coil pole segment end and a second bottom coil pole segment end, the pair of bottom coil loop pole segments longitudinally disposed substantially perpendicular to the direction in which the strip material travels, the pair of bottom coil loop pole segments separated by the pole pitch;

a lateral bottom coil segment disposed at the first strip channel side, the lateral bottom coil segment connected between the first bottom coil pole segment ends of the first bottom coil loop pole segment and the second bottom coil loop pole segment comprising the pair of bottom coil loop pole segments; (1) the first, the second and the third top coil loops, and (2) the first, the second and the third bottom coil loops respectively located at the opposing top and bottom of the strip channel through which the strip material travels, the first, the second and the third bottom coil loops respectively arranged mirror image to the first, the second and the third top coil loops;

a first common inter-pole segment located on a second side of the strip channel, the second side of the strip channel opposite the first side of the strip channel: (1) the second top coil pole segment end of the second top coil loop pole segment of the first top coil loop; (2) the second top coil pole segment end of the first top coil loop pole segment of the second top coil loop; (3) the second bottom coil pole segment end of the second bottom coil loop pole segment of the first bottom coil loop; and (4) the second bottom coil pole segment end of the first bottom coil loop pole segment of the second bottom coil loop electrically connected together by the first common inter-pole segment; and a second common inter-pole segment located on the second side of the strip channel: (1) the second top coil pole segment end of the second top coil loop pole segment of the second top coil loop; (2) the second top coil pole segment end of the first top coil loop pole segment of the third top coil loop; (3) the second bottom coil pole segment end of the second bottom coil loop pole segment of the second bottom coil loop; and (4) the second bottom coil pole segment end of the first bottom coil loop pole segment of the third bottom coil loop electrically connected together by the second common inter-pole segment;

a discrete flux concentrator disposed above and around a first side and a second side of each of the first and second top coil loop pole segments comprising the pair of top coil loop pole segments of the first, the second and the third top coil loops, and each of the first and second bottom coil loop pole segments comprising the pair of bottom coil loop pole segments of the first, the second and the third bottom coil loops;

a power supply branch conductor having a supply coil loop end and a feeder supply end, the power supply branch conductor disposed adjacently parallel to the first common inter-pole segment and separated from the first common inter-pole segment by a dielectric, the supply coil loop end of the power supply branch circuit connected to the second top coil pole segment end of the first top coil loop pole segment of the first top coil loop and the second bottom coil pole segment end of the first bottom coil loop pole segment of the first bottom coil loop;

a power supply feeder conductor having a branch supply end and a power source supply end, the power supply feeder conductor connected to the feeder supply end of the power supply branch conductor and disposed substantially perpendicular to the power supply branch conductor, the power source end of the power supply feeder conductor connected to a first source output of a single phase alternating current source;

a power return branch conductor having a return coil loop end and a feeder return end, the power return branch conductor disposed adjacently parallel to the second common inter-pole segment and separated from the second common inter-pole segment by the dielectric, the return coil loop end of the power supply branch conductor connected to the second top coil pole segment end of the second top coil loop pole segment of the third top coil loop and the second bottom coil pole segment end of the second bottom coil loop pole segment of the third bottom coil loop; and a power return feeder conductor having a branch return end and a power source return end, the power return feeder conductor connected to the feeder return end of the power return branch conductor and disposed substantially perpendicular to the power return branch conductor, the power source return end of the power supply feeder conductor connected to a second source output of the single phase alternating current source.

11. The inductor assembly of claim 10 wherein the first common inter-pole segment and the second common inter-pole segment each comprise a rectangular conductor electrically connected to a plate conductor.

12. The inductor assembly of claim 10 wherein the width of the discrete flux concentrator is at least as wide as the strip material traveling in the strip channel.

13. The inductor assembly of claim 10 wherein the first top coil loop having a first top coil loop internal through passage, the first bottom coil loop having a first bottom coil loop internal through passage, the second top coil loop having a second top coil loop internal through passage, the second bottom coil loop having a second bottom coil loop internal through passage, the third top coil loop having a third top coil loop internal through passage, and the third bottom coil loop having a third bottom coil loop internal through passage the inductor assembly further comprising:

an inductor assembly cooling system, the inductor assembly cooling system comprising:

a first isolated cooling system for a first cooling loop comprising the first top coil loop internal through passage and the first bottom coil loop internal through passage;

a second isolated cooling system for a second cooling loop comprising the second top coil loop internal through passage and the second bottom coil loop internal through passage; and a third isolated cooling system for a third cooling loop comprising the third top coil loop internal through passage and the third bottom coil loop internal through passage, whereby a cooling medium is circulated in the first, second and third isolated cooling systems.

14. The inductor assembly of claim 10 further comprising a refractory encasing the first, the second and the third top coil loops and the first, the second and the third bottom coil loops to form a refractory-encased top and bottom coil loops, the strip channel formed from a tunnel within the refractory-encased top and bottom coil loops.

15. The inductor assembly of claim 14 wherein the strip channel is a substantially gas-tight enclosure.

16. The inductor assembly of claim 10 wherein the strip material has a thickness approximately within the range of 228 microns to 635 microns.

* * * * *